(12) United States Patent
Kim et al.

(10) Patent No.: US 11,613,659 B2
(45) Date of Patent: Mar. 28, 2023

(54) ANTIFOULING COATING COMPOSITION COMPRISING COPOLYMER, METHOD OF PREPARING THE COPOLYMER, AND ANTIFOULING FILM MANUFACTURED FROM THE ANTIFOULING COATING COMPOSITION

(71) Applicant: YONSEI UNIVERSITY, UNIVERSITY—INDUSTRY FOUNDATION (UIF), Seoul (KR)

(72) Inventors: Byeong-Su Kim, Seoul (KR); Eeseul Shin, Ulsan (KR)

(73) Assignee: YONSEI UNIVERSITY, UNIVERSITY—INDUSTRY FOUNDATION (UIF), Seoul (KR)

(*) Notice: Subject to any disclaimer, the term of this patent is extended or adjusted under 35 U.S.C. 154(b) by 16 days.

(21) Appl. No.: 17/398,379

(22) Filed: Aug. 10, 2021

(65) Prior Publication Data

US 2022/0049112 A1 Feb. 17, 2022

(30) Foreign Application Priority Data

Aug. 11, 2020 (KR) .................. 10-2020-0100734

(51) Int. Cl.
| | | |
|---|---|---|
| C09D 5/16 | (2006.01) | |
| C08G 65/00 | (2006.01) | |
| C09D 171/02 | (2006.01) | |
| B01J 31/02 | (2006.01) | |

(52) U.S. Cl.
CPC ........ *C09D 5/1662* (2013.01); *B01J 31/0264* (2013.01); *C08G 65/002* (2013.01); *C09D 171/02* (2013.01)

(58) Field of Classification Search
CPC .. C09D 5/1662; C09D 171/02; C08G 65/002; B01J 31/0264
USPC ........................................... 523/122
See application file for complete search history.

(56) References Cited

U.S. PATENT DOCUMENTS

| | | | | |
|---|---|---|---|---|
| 8,916,652 | B2 * | 12/2014 | Dalsin .................. | A01N 37/40 527/200 |
| 10,912,859 | B2 * | 2/2021 | Delmotte ......... | A61B 17/00491 |
| 2016/0160097 | A1 * | 6/2016 | Waite .................. | C07F 7/1804 526/279 |
| 2016/0346424 | A1 | 12/2016 | Lee et al. | |

OTHER PUBLICATIONS

Kloecker et al. "Conducting Polymer with Orthogonal Catechol and Disulfide Anchor Groups for the Assembly of Inorganic Nanostructures", Macromolecules, (2017), 50(10), 3779-3788 (Year: 2017).*

Nlederer et al. "Catechol Acetonide Glycidyl Ether (CAGE): A Functional Epoxide Monomer for Linear and Hyperbranched Multi-Catechol Functional Polyether Architectures", Macromolecules, (2016), 49(5), 1655-1665 (Year: 2016).*

De Vos, W. M.; Biesheuvel, P. M.; De Keizer, A.; Kleijn, J. M.; Stuart, M. A. C., Adsorption of the protein bovine serum albumin in a planar poly(acrylic acid) brush layer as measured by optical reflectometry. Langmuir 2008, 24, 6575-6584.

E. Shin, Master Thesis, Mussel-inspired Polyglycerol Synthesis and Versatile Surface Modification, Ulsan Natl. Inst. Sci. Technol. 2015.

Hu, Q.; Ouyang, S.; Li, J.; Cao, Z., Raman spectroscopic investigation on pure D2O/H2O from 303 to 573 K: interpretation and implications for water structure. J. Raman Spectrosc. 2017, 48, 610-617.

J. Yoo, et al., Cooperative Catechol-Functionalized Polypept(o)ideBrushes and Ag Nanoparticles for a Combination of ProteinResistance and Antimicrobial Activity on Metal Oxide Surfaces, Biomacromolecules 2018, 37 pp.

Lowrey, D. D.; Tasaka, K.; Kindt, J. H.; Banquy, X.; Belman, N.; Min, Y.; Pesika, N. S.; Mordukhovich, G.; Israelachvili, J. N., High-Speed Friction Measurements Using a Modified Surface Forces Apparatus. Tribol Lett 2011, 42, 117-127.

S. Moulay, Dopa/Catechol-Tethered Polymers:Bioadhesives and Biomimetic AdhesiveMaterials, Polymer Reviews, 2014, 54:3, 436-513.

T. X. Viegas, et al., Polyoxazoline: Chemistry, Properties, and Applicationsin Drug Delivery, Bioconjugate Chem. 2011, 22, 976-986.

Vanommeslaeghe, K.; Hatcher, E.; Acharya, C.; Kundu, S.; Zhong, S.; Shim, J.; Darian, E.; Guvench, O.; Lopes, P.; Vorobyov, I.; et al. CHARMM General Force Field: A Force Field for Drug-like Molecules Compatible with the CHARMM All-Atom Additive Biological Force Fields. J. Comput. Chem. 2010, 31, 671-690.

Wang, X.; Berger, R.; Ramos, J. I.; Wang, T.; Koynov, K.; Liu, G.; Butt, H.-J.; Wu, S., Nanopatterns of polymer brushes for understanding protein adsorption on the nanoscale. RSC Adv. 2014, 4, 45059-45064.

(Continued)

*Primary Examiner* — Michael M. Bernshteyn
(74) *Attorney, Agent, or Firm* — Cantor Colburn LLP

(57) ABSTRACT

An antifouling coating composition including a copolymer including two or more moieties represented by Chemical Formula 1, and a linking group between the two or more moieties, a method of preparing the copolymer, and an antifouling film produced from the antifouling coating composition.

[Chemical Formula 1]

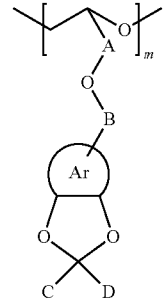

In Chemical Formula 1, the definitions of Ar, A, B, C, D, and m are as described in the specification.

20 Claims, 9 Drawing Sheets

(56) References Cited

OTHER PUBLICATIONS

A. Chaicham, et al., Highly effective discrimination of catecholaminederivatives via FRET-on/off processes induced by theintermolecular assembly with two fluorescencesensors, Chem. Commun. 2013, 49, 9287-9289.

A. Thomas, et al., The "Needle in the Haystack" Makes the Difference: Linear andHyperbranched Polyglycerols with a Single Catechol Moiety forMetal Oxide Nanoparticle Coating, Macromolecules 2014, 47, 4557-4566.

B. D. Ratner, The blood compatibility catastrophe, J. Biomed. Mater. Res. 1993, 27, 283-287.

B. Mrabet, et al., Anti-fouling poly(2-hydoxyethyl methacrylate) surface coatings with specificbacteria recognition capabilities. Surf. Sci. 2009, 603, 2422-2429.

B. P. Lee, et al., Mussel-Inspired Adhesives and Coatings, Annu. Rev. Mater. Res. 2011, 41: 99-132.

B. Xu, et al., Construction of catechol-containing semifluorinatedasymmetric polymer brush via successive RAFT polymerization and ATRP, Polym. Chem. 2017, 8, 7499-7506.

C. Fruijtier-Polloth, Safety assessment on polyethylene glycols (PEGs) andtheir derivatives as used in cosmetic products. Toxicology 2005, 214, 1-38.

D. J. Hardy, et al., Multilevel Summation Method for Electrostatic Force Evaluation, J. Chem. Theory Comput. 2015, 11, 766-779.

E. Fahrländer, et al., PEGylated human serum albumin (HSA)nanoparticles: preparation, characterizationand quantification of the PEGylation extent, Nanotechnology 2015, 26, 145103, 12 pp.

E. M. Benetti, et al., Loops and Cycles at Surfaces:The Unique Properties of Topological Polymer Brushes, Chem. Eur J. 2017, 23, 12433-12442.

E. Shin, et al., Bioinspired Catecholic Primers for Rigid and Ductile Dental ResinComposites, ACS Appl. Mater. Interfaces 2018, 10, 1520-1527.

G. D. Bixler, B. Bhushan, Biofouling: lessons from nature, Philos. Trans. R. Soc. A Math. Phys. Eng. Sci. 2012, 370, 2381-2417.

G. Morgese, et al., Topological Polymer Chemistry Enters Surface Science: Linear versusCyclic Polymer Brushes, Angew. Chem. Int. Ed. 2016, 55, 15583-15588.

G. W. Greene, et al., Lubricin: A versatile, biological anti-adhesive with propertiescomparable to polyethylene glycol, Biomaterials 2015, 53, 127-136.

H. Lee, et al., Catechol-Grafted Poly(ethylene glycol) for PEGylation onVersatile Substrates, Langmuir 2010, 26(6), 3790-3793.

H. Misaka, et al., Synthesis of End-Functionalized Polyethers by PhosphazeneBase-Catalyzed Ring-Opening Polymerization of 1,2-ButyleneOxide and Glycidyl Ether, Journal of Polymer Science Part A: Polymer Chemistry 2012, 50, 1941-1952.

H. S. Kim, et al., Electrospun catechol-modified poly(ethyleneglycol)nanofibrous mesh for anti-fouling properties, J. Mater. Chem. B 2013, 1, 3940-3949.

I. Davidson, et al., Mini-review: Assessing the drivers of ship biofouling management—aligning industry and biosecurity goals, Biofouling 2016, vol. 32, No. 4, 411-428.

J. Chen, et al., Biocompatibility studies of poly(ethylene glycol)-modified titanium for cardiovascular devices, J. Bioact. Compat. Polym. 2012, 27, 565-584.

J. Duan, et al., Synthesis of functional catechols as monomersof mussel-inspired biomimetic polymers, Green Chem. 2018, 20, 912-920.

J. H. Ryu, Catechol-Functionalized Chitosan/Pluronic Hydrogels for TissueAdhesives and Hemostatic Materials, Biomacromolecules 2011, 12, 2653-2659.

J. Heo, et al., Improved Performance of Protected Catecholic Polysiloxanes forBioinspired Wet Adhesion to Surface Dxides, J. Am. Chem. Soc. 2012, 134, 20139-20145.

J. Israelachvili, et al., Recent advances in the surface forcesapparatus (SFA) technique, Rep. Prog. Phys. 73 (2010) 036601 (16pp).

J. L. Dalsin, et al., Mussel Adhesive Protein Mimetic Polymers for thePreparation of Nonfouling Surfaces, J. Am. Chem. Soc 2003, 125, 4253-4258.

J. L. Dalsin, et al., Protein Resistance of Titanium Oxide Surfaces Modifiedby Biologically Inspired mPEG-DOPA, Langmuir 2005, 21, 640-646.

J. M. Kim, et al., Precise Analysis of Polymer Rotational Dynamics, 2016, Scientific Reports | 6:19127 | DOI: 10.1038/srep19127, 7 pp.

J. N. Israelachvili, Thin Film Studies Using Multiple-Beam Interferometry, Journal of Colloid and Interface Science vol. 44, No. 2, Aug. 1973, 259-272.

J. Sedö, et al., Catechol-Based Biomimetic Functional Materials, Adv. Mater. 2013, 25, 653-701.

J. Y. Park, et al., Mussel-inspired modification of dextran for protein-resistant coatingsof titanium oxide, Carbohydr. Polym. 2013, 97, 753-757.

James C. Phillips, et al., Scalable Molecular Dynamics with NAMD, 2005, vol. 26, No. 16, Journal of Computational Chemistry, 1781-1802.

K. A. Waller, et al., Role of lubricin and boundary lubrication in theprevention of chondrocyte apoptosis, Proc. Natl. Acad. Sci. U. S. A. 2013, 110, 5852-5857.

K. L. Prime, et al., , J. Am. Chem. Soc. 1993, 115, 10714-10721.

K. Niederer, et al., Catechol Acetonide Glycidyl Ether (CAGE): A Functional EpoxideMonomer for Linear and Hyperbranched Multi-Catechol FunctionalPolyether Architectures, Macromolecules 2016, 49, 1655-1665.

K. Vanommeslaeghe, CHARMM General Force Field: A Force Field forDrug-Like Molecules Compatible with the CHARMMAll-Atom Additive Biological Force Fields, J. Comput. Chem. 2010, vol. 31, No. 4, 671-690.

L. Li, et al., Injectable Self-Healing Hydrogel with Antimicrobial and AntifoulingProperties, ACS Appl. Mater. Interfaces 2017, 9, 9221-9225.

L. Li, et al., Mussel-inspired antifouling coatings bearingpolymer loops, Chem. Commun. 2015, 51, 15780-15783.

M. Divandari, et al., Topology Effects on the Structural and Physicochemical Propertiesof Polymer Brushes, Macromolecules 2017, 50, 7760-7769.

M. Gu, et al., Unraveling the importance of controlled architecture in bimetallicmultilayer electrode toward efficient electrocatalyst, Nano Energy 30 (2016) 658-666.

M. Tanaka, et al., Study of Blood Compatibility with Poly(2-methoxyethylacrylate). Relationship between Water Structure and Plateletcompatibility in Poly(2-methoxyethylacrylate-co-2-hydroxyethylmethacrylate), Biomacromolecules 2002, 3, 36-41.

N. Patil, et al. Mussel-inspired protein-repelling ambivalentblock copolymers: controlled synthesis andcharacterization, Polym. Chem. 2015, 6, 2919, 15 pp.

Naoyuki Ishida, et al., Effect of Grafting Density on Phase Transition Behavior forPoly(N-isopropylacryamide) Brushes in Aqueous SolutionsStudied by AFM and QCM-D, Macromolecules 2010, 43, 7269-7276.

Q. Liu, et al., Ultralow Fouling Polyacrylamide on Gold Surfaces via Surface-Initiated Atom Transfer Radical Polymerization, Biomacromolecules 2012, 13, 1086-1092.

Q. Wei, et al., Mussel-Inspired Dendritic Polymers as Universal MultifunctionalCoatings, Angew. Chem. Int. Ed. 2014, 53, 11650-11655.

R. H. Al-Shakhshir, et al., Vaccine 1995, vol. 13, 41-44.

S. C. Goh, et al., Polydopamine-polyethylene glycol-albuminantifouling coatings on multiple substrates, J. Mater. Chem. B2018, 6, 940-949.

S. Liu, et al., A high efficiency approach for a titanium surfaceantifouling modification: PEG-o-quinone linkedwith titanium via electron transfer process, J. Mater. Chem. B 2014, 2, 6758-6766.

S. R. Sheth, et al., Measurements of attractive forces between proteins andend-grafted poly(ethylene glycol) chains, Proc. Natl. Acad. Sci. USAvol. 94, Aug. 1997, pp. 8399-8404.

Sukumar Rajauria, et al., Nanoscale wear and kinetic friction between atomically smooth surfacesliding at high speeds, Applied Physics Letters 106, 081604 (2015), 4 pp.

(56) References Cited

OTHER PUBLICATIONS

Sungbaek Seo, et al., Significant Performance Enhancement of Polymer Resinsby Bioinspired Dynamic Bonding, Adv. Mater. 2017, 29, 1703026, 9 pp.

T. Darden, et al., Particle mesh Ewald: An N-log(N) method for Ewald sumsin large systems, J. Chem. Phys. 1993, 98, 10089-10092.

T. Kang, et al. Mussel-Inspired Anchoring of Polymer LoopsThat Provide Superior Surface Lubrication andAntifouling Properties, ACS Nano 2016, 10, 930-937.

V. S. Wilms, et al., Catechol-Initiated Polyethers: Multifunctional Hydrophilic Ligandsfor PEGylation and Functionalization of Metal Oxide Nanoparticles, Biomacromolecules 2013, 14, 193-199.

W. Humphrey, et al., VMD: Visual Molecular Dynamics, J. Mol. Graph. Model. 1996, 14, 33-38.

W. L. Jorgensen, et al., Comparison of simple potential functions for simulatingliquid water, J. Chem. Phys. 79(2). Jul. 15, 1983, 926-935.

W. T. E. Bosker, et al., BSA adsorption on bimodal PEO brushes, Journal of Colloid and Interface Science 286 (2005) 496-503.

W. Yan, et al., Design and characterization of ultrastable,biopassive and lubricious cyclic poly(2-alkyl-2-oxazoline) brushes, Polym. Chem. 2018, 9, 2580-2589.

Weikang Zhao, et al., A novel biodegradable Mg—1Zn—0.5Sn alloy: Mechanical properties, corrosion behavior, biocompatibility, and antibacterial activity, Journal of Magnesium and Alloys 8 (2020) 374-386.

X. Banquy, et al., Bioinspired Bottle-Brush Polymer Exhibits Low Friction andAmontons-like Behavior, J. Am. Chem. Soc. 2014, 136, 6199-6202.

X. Huang, et al., A Practical Model of Quartz Crystal Microbalancein Actual Applications, Sensors (Switzerland) 2017, 17, 1785, 9 pp.

Zhihao Yang, et al., Protein Interactions with Poly(ethylene glycol)Self-Assembled Monolayers on Glass Substrates: Diffusionand Adsorption, Langmuir 1999, 15, 8405-841.

Angus Hucknall, et al., In Pursuit of Zero: Polymer Brushes that Resist theAdsorption of Proteins, Adv Mater, 2009, 21, 2441-2446.

Anja Thomas, et al., Beyond Poly(ethylene glycol): Linear Polyglycerol as aMultifunctional Polyether for Biomedical and PharmaceuticalApplications, Biomacromolecules 2014, 15, 1935-1954.

Benjamin S. Flavel, Grafting of Poly(ethylene glycol) on Click Chemistry Modified Si(100) Surfaces, Langmuir, 2013, 29, 8355-8362.

Chao Zhang, et al., Tough and Alkaline-Resistant Mussel-Inspired Wet Adhesion withSurface Salt Displacement via Polydopamine/Amine Synergy, Langmuir, 2019, 35, 5257-5263.

Eeseul Shin, et al., Mussel-Inspired Copolyether Loop with Superior Antifouling Behavior, Macromolecules 2020, 53, 3551-3562.

Eric W. Danner, et al., Adhesion of Mussel Foot Protein Mefp-5 to Mica: An UnderwaterSuperglue, Biochemistry, 2012, 51, 6511-6518.

Greg P. Maier, et al., Adaptive synergy between catecholand lysine promotes wet adhesion bysurface salt displacement, Science 2015, vol. 349, 628-632.

Jeffrey L. Dalsin, et al., Mussel Adhesive Protein Mimetic Polymers for thePreparation of Nonfouling Surfaces, Am. Chem. Soc., 2003, 125, 4253-4258.

Jialong Chen, et al., Biocompatibility studies of poly(ethylene glycol)-modified titanium for cardiovascular devices, J. Bioact. Compat. Polym. 2012, 27(6), 565-584.

Kerstin Niederer, et al., Catechol Acetonide Glycidyl Ether (CAGE): A Functional EpoxideMonomer for Linear and Hyperbranched Multi-Catechol FunctionalPolyether Architectures, Macromolecules 2016, 49, 1655-1665.

Kevin L. Prime, et al., Adsorption of Proteins onto Surfaces Containing End-Attached OHgo(ethylene oxide): A Model System Using Self-Assembled Monolayers, J. Am. Chem. Soc. 1993, 115, 10714-10721.

Lin Li, et al., Mussel-inspired antifouling coatings bearingpolymer loops, Chem. Commun., 2015, 51, 15780-15783.

Mateusz Gosecki, et al., Polyglycidol, Its Derivatives, andPolyglycidol-Containing Copolymers—Synthesis andMedical Applications, Polymers 2016, 8, 227, 25 pp.

Matthew A. Gebbie, et al., Tuning underwater adhesion withcation-π interactions, Nat. Chem., 2017, 9, 473-480.

Runnan Zhang, et al., Antifouling membranes for sustainable waterpurification: strategies and mechanisms, Chem. Soc. Rev., 2016, 45, 5888-5924.

Suhyun Son, et al., Architecture-Controlled Synthesis of Redox-Degradable Hyperbranched Polyglycerol Block Copolymers and the Structural Implications of theirDegradation, Journal of Polymer Science, Part a Polymer Chemistry 2016, 54, 1752-1761.

Taegon Kang, et al., Mussel-Inspired Anchoring of Polymer LoopsThat Provide Superior Surface Lubrication andAntifouling Properties, ACS Nano 2016, 10, 930-937.

Jana Herzberger, et al., Polymerization of Ethylene Oxide, Propylene Oxide, and OtherAlkylene Oxides: Synthesis, Novel Polymer Architectures, and Bioconjugation, Chem. Rev. 2016, vol. 116, No. 4, pp. 2170-2243 Published:Dec. 29, 2015).

* cited by examiner

ANTIFOULING COATING COMPOSITION COMPRISING COPOLYMER, METHOD OF PREPARING THE COPOLYMER, AND ANTIFOULING FILM MANUFACTURED FROM THE ANTIFOULING COATING COMPOSITION

CROSS-REFERENCE TO RELATED APPLICATION

This application claims priority to and the benefit of Korean Patent Application No. 10-2020-0100734 filed in the Korean Intellectual Property Office on Aug. 11, 2020, the entire contents of which are incorporated herein by reference.

BACKGROUND OF THE INVENTION

(a) Field of the Invention

An antifouling coating composition including a copolymer, a method for preparing the copolymer, and an antifouling film produced from the antifouling composition are disclosed.

(b) Description of the Related Art

Biofilms (biofouling) are membrane-like structures fixed to a solid surface by microorganisms or organisms, and may be formed on almost all types of solid surfaces and tissues of living organisms.

For example, biofilms may be formed on surfaces of artificial facilities that may be accessed by microorganisms, such as water pipes, water purifiers, and air purification facilities, including medical devices such as catheters and various implants.

When biofilms are formed on a medical device in vivo, inflammation due to contact may be caused, the biofilms continuously release microorganisms, and the biofilms formed on the surfaces of artificial facilities may be a threat to public health.

However, the already formed biofilms are strongly attached to the solid surface and are difficult to remove, and the microorganisms in the biofilms have much stronger resistance to harsh environments, antibiotics, attack of immune cells, etc. than in the case of a planktonic life, and thus they are difficult to sterilize and disinfect.

Accordingly, there are needs for an antifouling material capable of effectively preventing the formation of biofilms, and/or a surface treatment technology of a solid.

SUMMARY OF THE INVENTION

In an embodiment, an antifouling coating composition that may effectively prevent the formation of biofilms on various types of solid surfaces is provided.

In another embodiment, a method for preparing a copolymer included in the antifouling coating composition is provided.

In another embodiment, an antifouling film produced from the antifouling coating composition is provided.

An embodiment of the present invention provides an antifouling coating composition including a copolymer including two or more moieties represented by Chemical Formula 1, and a linking group present between the two or more moieties.

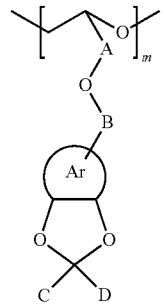

[Chemical Formula 1]

In Chemical Formula 1,

Ar is a substituted or unsubstituted C6 to C16 aromatic hydrocarbon ring,

A and B are independently a single bond, a substituted or unsubstituted C1 to C3 aliphatic hydrocarbon group, a substituted or unsubstituted C3 to C16 alicyclic hydrocarbon group, a substituted or unsubstituted C6 to C20 aromatic hydrocarbon group, a substituted or unsubstituted C1 to C20 heteroalicyclic hydrocarbon group, —S—, —$SO_2$—, —($CR^aR^b$)($NR^cR^d$), or a combination thereof, wherein $R^a$ to $R^d$ are independently hydrogen, a substituted or unsubstituted C1 to C20 aliphatic hydrocarbon group, a substituted or unsubstituted C1 to C20 heteroaliphatic hydrocarbon group, a substituted or unsubstituted C3 to C20 alicyclic hydrocarbon group, a substituted or unsubstituted C1 to C20 heteroalicyclic hydrocarbon group, a substituted or unsubstituted C6 to C30 aromatic hydrocarbon group, a substituted or unsubstituted C2 to C30 heteroaromatic hydrocarbon group, or a combination thereof, C and D are independently hydrogen, a hydroxy group, a substituted or unsubstituted C1 to C20 aliphatic hydrocarbon group, a substituted or unsubstituted C1 to C20 heteroaliphatic hydrocarbon group, a substituted or unsubstituted C3 to C20 alicyclic hydrocarbon group, a substituted or unsubstituted C1 to C20 heteroalicyclic hydrocarbon group, a substituted or unsubstituted C6 to C20 aromatic hydrocarbon group, a substituted or unsubstituted C2 to C20 heteroaromatic hydrocarbon group, or a combination thereof, and m is an integer of 4 or more.

The linking group may include a structural unit represented by Chemical Formula 2.

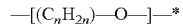

[Chemical Formula 2]

In Chemical Formula 2, n is an integer of 2 to 4, and

* is a linking point.

A weight average molecular weight of the linking group may be about 500 g/mol to about 50,000 g/mol.

Ar of Chemical Formula 1 may be a substituted or unsubstituted benzene, a substituted or unsubstituted naphthalene, a substituted or unsubstituted anthracene, a substituted or unsubstituted phenanthrene, a substituted or unsubstituted pyrene, or a combination thereof.

A and B of Chemical Formula 1 may independently be a substituted or unsubstituted C1 to C3 alkylene group, a substituted or unsubstituted C2 or C3 alkenylene group, or a combination thereof.

A and B of Chemical Formula 1 may independently be a substituted or unsubstituted methylene group, a substituted or unsubstituted ethylene group, a substituted or unsubstituted propylene group, or a combination thereof.

C and D of Chemical Formula 1 may independently be a substituted or unsubstituted methyl group, a substituted or unsubstituted ethyl group, a substituted or unsubstituted propyl group, a substituted or unsubstituted butyl group, a substituted or unsubstituted pentyl group, a substituted or unsubstituted hexyl group, or a combination thereof.

m of Chemical Formula 1 may be an integer of 4 to 100.

A number average molecular weight of the copolymer may be about 1000 g/mol to about 70,000 g/mol.

Polydispersity of the copolymer may be about 1 to about 2.

In another embodiment of the present invention, a method of preparing a copolymer includes reacting a substituted or unsubstituted polyalkylene glycol, an organic base catalyst including a substituted or unsubstituted C3 to C20 branched alkyl group, and a compound represented by Chemical Formula 3.

[Chemical Formula 3]

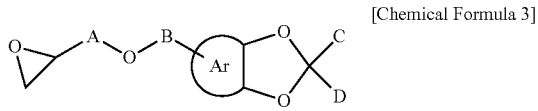

In Chemical Formula 3,

Ar, A, B, C, and D are the same as defined in Chemical Formula 1, respectively.

The substituted or unsubstituted polyalkylene glycol may be polyethylene glycol, polypropylene glycol, methoxypolyethylene glycol, ethoxypolyethylene glycol, propoxy polyethylene glycol, methoxy polypropylene glycol, ethoxy polypropylene glycol, propoxy polypropylene glycol, or a combination thereof.

The organic base catalyst including the substituted or unsubstituted C3 to C20 branched alkyl group may be represented by Chemical Formula 4.

[Chemical Formula 4]

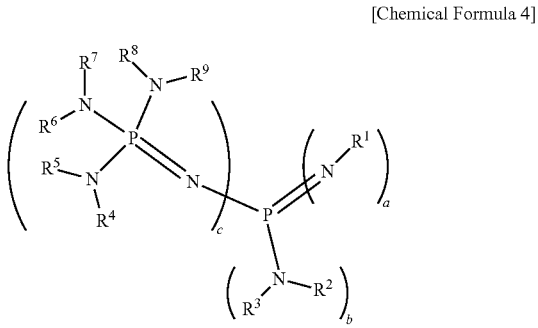

In Chemical Formula 4, $R^1$ to $R^9$ are independently a substituted or unsubstituted C1 to C20 alkyl group, a substituted or unsubstituted C3 to C30 cycloalkyl group, or a combination thereof, or at least two adjacent groups of $R^1$ to $R^9$ are linked to each other to form a ring, at least one of $R^1$ to $R^9$ is a substituted or unsubstituted C3 to C20 branched alkyl group, and a to c are independently an integer of 0 to 5, provided that the sum of 2a, b, and c is 5.

$R^1$ of Chemical Formula 4 may be a substituted or unsubstituted C3 to C20 branched alkyl group.

The substituted or unsubstituted C3 to C20 branched alkyl group may be a tert-butyl group.

The reaction may be performed at about 20° C. to about 65° C.

In another embodiment of the present disclosure, an antifouling film produced from the antifouling coating composition is provided.

The antifouling film may be produced by coating the antifouling coating composition on a surface requiring antifouling coating.

The antifouling coating composition may be treated with a catalyst for detaching an acetonide group of the copolymer in the composition before the coating.

The catalyst may include hydrochloric acid (HCl in $H_2O$), zirconium tetrachloride ($ZrCl_4$), aqueous tert-butyl hydroperoxide, indium trichloride, trifluoroacetic acid ($CF_3CO_2H$), perchloric acid ($HOClO_4$), para-toluene sulfonic acid (p-TsOH), or combinations thereof.

The antifouling coating composition according to the above embodiment may effectively prevent formation of a biofilm by including a copolymer having excellent hydrophilicity and adhesion properties, and may be applied to various solid surfaces.

BRIEF DESCRIPTION OF THE DRAWINGS

FIG. 2 is a graph showing molecular mechanical simulation results for the interaction energy of a polymer and a solid surface depending upon the number of the repeated structural units represented by Chemical Formula 1a.

DETAILED DESCRIPTION OF THE EMBODIMENTS

Figure 1A:
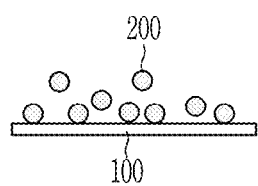
FIG. 1A is a schematic view showing that biological polluting materials 200 are present on a substrate 100 which is not coated with an antifouling composition.

Hereinafter, embodiments of the present disclosure are described in detail with reference to the accompanying drawings so that those of ordinary skill in the art may easily implement the present disclosure.

However, this disclosure may be embodied in many different forms and is not to be construed as limited to the example embodiments set forth herein.

The terms used in the present specification are used for describing exemplary embodiments and are not intended to limit the present disclosure.

In the present specification, the singular form also includes the plural form unless specifically stated otherwise in the description.

As used herein, "comprises" and/or "comprising" do not exclude the presence or addition of one or more other components, or steps, of the mentioned components, or steps.

Further, the singular includes the plural unless mentioned otherwise.

As used herein, when specific definition is not otherwise provided, "substituted" refers to replacement of a hydrogen atom of a compound by a substituent selected from deuterium, a halogen atom (F, Br, Cl, or I), a hydroxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid group or a salt thereof, a C1 to C30 alkyl group, a C2 to C30 alkenyl group, a C2 to C30 alkynyl group, a C6 to C30 aryl group, a C7 to C30 arylalkyl group, a C1 to C30 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C2 to C30 heterocyclic group, and a combination thereof. The number of carbon atoms in any substituent is not counted in the substituted moiety. Thus, a methyl-substituted C3 to C30 cycloalkyl group may have a total of 4 to 31 carbon atoms.

In addition, two adjacent substituents of the hydroxy group, amino group, thiol group, ester group, carboxyl group or a salt thereof, sulfonic acid group or a salt thereof, phosphoric acid group or a salt thereof, C1 to C30 alkyl group, C2 to C30 alkenyl group, C2 to C30 alkynyl group, C7 to C30 arylalkyl group, C1 to C30 alkoxy group, or C1 to C20 heteroalkyl group may be fused to form a ring.

For example, the substituted C6 to C30 aryl group may be fused with another adjacent substituted C6 to C30 aryl group to form a substituted or unsubstituted fluorene ring.

As used herein, when a definition is not otherwise provided, "hetero" refers to one including 1 to 3 heteroatoms selected from N, O, S, Se, and P.

As used herein, "alkylene group" refers to a straight or branched saturated aliphatic hydrocarbon group having a valence of at least two, optionally substituted with one or more substituents where indicated.

"Arylene group" refers to a functional group having a valence of at least two obtained by removal of two hydrogen atoms in an aromatic ring, optionally substituted with one or more substituents where indicated.

In addition, "aliphatic hydrocarbon group" refers to a C1 to C30 linear or branched alkyl group, "aromatic hydrocarbon group" may be a C6 to C30 aryl group or a C2 to C30 heteroaryl group, and "alicyclic hydrocarbon group" may be a C3 to C30 cycloalkyl group, a C3 to C30 cycloalkenyl group, and a C3 to C30 cycloalkynyl group.

As used herein, when a definition is not otherwise provided, "alkyl group" refers to a linear or branched aliphatic hydrocarbon group.

The alkyl group may be "a saturated alkyl group" without any double bonds or triple bonds.

The alkyl group may be a C1 to C20 alkyl group.

For example, the alkyl group may be a C1 to C10 alkyl group, a C1 to C8 alkyl group, a C1 to C6 alkyl group, or a C1 to C4 alkyl group.

For example, the C1 to C4 alkyl group may be a methyl, ethyl, propyl, isopropyl, n-butyl, isobutyl, sec-butyl, or tert-butyl group.

As used herein, when a definition is not otherwise provided, "saturated aliphatic hydrocarbon group" refers to a hydrocarbon group in which a bond between a carbon atom and a carbon atom in a molecule is composed of a single bond.

The saturated aliphatic hydrocarbon group may be a C1 to C20 saturated aliphatic hydrocarbon group.

For example, the saturated aliphatic hydrocarbon group may be a C1 to C10 saturated aliphatic hydrocarbon group, a C1 to C8 saturated aliphatic hydrocarbon group, a C1 to C6 saturated aliphatic hydrocarbon group, a C1 to C4 saturated aliphatic hydrocarbon group, and a C1 to C2 saturated aliphatic hydrocarbon group.

For example, the C1 to C6 saturated aliphatic hydrocarbon group may be a methyl group, an ethyl group, a propyl group, an isopropyl group, an n-butyl group, an isobutyl group, a sec-butyl group, a 2,2-dimethylpropyl group, or a tert-butyl group.

As used herein, a polymer may include both of an oligomer and a polymer.

As used herein, when a definition is not otherwise provided, a copolymer is an alternating copolymer, a block copolymer, a random copolymer, a graft copolymer, or a crosslinked copolymer, or all of them.

The biofilm (biofouling) fixed to the solid surface continuously releases microorganisms and causes inflammation by the contact, which is harmful to the public health.

Thereby, in order to prevent generating the biofilm, an antifouling coating composition which is applied on the various solid surfaces to provide an antifouling film is needed.

However, as moist conventional antifouling coating compositions include heavy metals or toxic materials, it is required to provide an antifouling coating composition which is environmentally friendly by including non-metal and non-toxic materials and also has biocompatibility so as to be employed for medical equipment.

Hereinafter, an antifouling coating composition according to an embodiment is described.

The antifouling coating composition according to an embodiment includes a polymer and a solvent.

The polymer may be a copolymer having hydrophilicity, for example, a block copolymer including three or more blocks.

At least one block of the three or more blocks may include a main chain of a substituted or unsubstituted alkylene glycol and a side chain of a repeating unit including a monovalent organic group including a substituted or unsubstituted acetonide group at a terminal end, wherein the substituted or unsubstituted acetonide group may be fused in the aromatic ring.

For example, at least one block of the three or more blocks may include a repeating unit represented by a predetermined chemical formula.

Thus, the copolymer may have hydrophilicity and may also provide excellent adhesion properties to the solid surface.

For example, the copolymer may include two or more moieties represented by Chemical Formula 1, and a linking group between the two or more moieties.

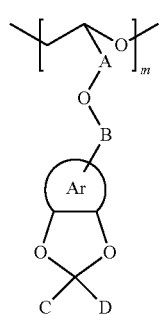

[Chemical Formula 1]

Herein, Ar is a substituted or unsubstituted C6 to C16 aromatic hydrocarbon ring, A and B are independently a single bond, a substituted or unsubstituted C1 to C3 aliphatic hydrocarbon group, a substituted or unsubstituted C3 to C16 alicyclic hydrocarbon group, a substituted or unsubstituted C6 to C20 aromatic hydrocarbon group, a substituted or unsubstituted c1 to C20 heteroalicyclic hydrocarbon group, —S—, —SO$_2$—, —(CR$^a$R$^b$)(NR$^c$R$^d$), or a combination thereof, wherein R$^a$ to R$^d$ are independently hydrogen, a substituted or unsubstituted C1 to C20 aliphatic hydrocarbon group, a substituted or unsubstituted C1 to C20 heteroaliphatic hydrocarbon group, a substituted or unsubstituted C3 to C20 alicyclic hydrocarbon group, a substituted or unsubstituted C1 to C20 heteroalicyclic hydrocarbon group, a substituted or unsubstituted C6 to C30 aromatic hydrocarbon group, a substituted or unsubstituted C2 to C30 heteroaromatic hydrocarbon group, or a combination thereof, C and D are independently hydrogen, a hydroxy group, a substituted or unsubstituted C1 to C20 aliphatic hydrocarbon group, a substituted or unsubstituted C1 to C20 heteroaliphatic hydrocarbon group, a substituted or unsubstituted C3 to C20 alicyclic hydrocarbon group, a substituted or unsubstituted C1 to C20 heteroalicyclic hydrocarbon group, a substituted or unsubstituted C6 to C20 aromatic hydrocarbon group, a substituted or unsubstituted C2 to C20 heteroaromatic hydrocarbon group, or a combination thereof, and m is an integer of 4 or more.

In order to provide the adhesion properties to the solid surface, conventionally, the terminal end is modified with a thiol group, an aldehyde group, an amino group, or a silane polymer, but the number of modifiable functional groups is limited, so the applicable substrate is limited, and a complicated method of modifying a surface of the substrate or the like is required to provide sufficient adhesion properties.

On the other hand, the block copolymer including at least two moieties represented by Chemical Formula 1 may have excellent adhesion properties as well as maintain hydrophilicity, so as to provide antifouling properties by being employed for the various solid surfaces.

Ar of Chemical Formula 1 may be a substituted or unsubstituted benzene or a substituted or unsubstituted polycyclic aromatic hydrocarbon, wherein the polycyclic aromatic hydrocarbon may be a non-condensed aromatic ring, a condensed aromatic ring, or a combination thereof.

For example, Ar may be a substituted or unsubstituted benzene, a substituted or unsubstituted naphthalene, a substituted or unsubstituted anthracene, a substituted or unsubstituted phenanthrene, a substituted or unsubstituted pyrene, or a combination thereof, but is not limited thereto.

A and B of Chemical Formula 1 may independently be a substituted or unsubstituted C1 to C3 aliphatic hydrocarbon group.

Herein, the aliphatic hydrocarbon group refers to both a saturated aliphatic hydrocarbon group and an unsaturated aliphatic hydrocarbon group.

For example, A and B of Chemical Formula 1 may independently be a substituted or unsubstituted C1 to C3 alkylene group, a substituted or unsubstituted C2 to C3 alkenylene group, or a combination thereof.

For example, A and B of Chemical Formula 1 may independently be a substituted or unsubstituted methylene group, a substituted or unsubstituted ethylene group, a substituted or unsubstituted propylene group, or a combination thereof, but are not limited thereto.

A and B of Chemical Formula 1 may be the same or different.

For example, the carbon number of B may be more than the carbon number of A, for example, A may be a substituted or unsubstituted methylene group, and B is a substituted or unsubstituted ethylene group or a substituted or unsubstituted propylene group.

C and D of Chemical Formula 1 may independently be a substituted or unsubstituted C1 to C20 aliphatic hydrocarbon group.

The substituted or unsubstituted C1 to C20 aliphatic hydrocarbon group may be, for example, a C1 to C15 aliphatic hydrocarbon group, for example, a C1 to C10 aliphatic hydrocarbon group, for example, a C1 to C7 aliphatic hydrocarbon group, for example, a C1 to C5 aliphatic hydrocarbon group, for example, a C1 to C4 aliphatic hydrocarbon group, or for example, a C1 to C3 aliphatic hydrocarbon group.

Herein, the aliphatic hydrocarbon group refers to both a saturated aliphatic hydrocarbon group and an unsaturated aliphatic hydrocarbon group.

For example, C and D may independently be a substituted or unsubstituted C1 to C20 alkyl group, a substituted or unsubstituted C2 to C20 alkenyl group, or a combination thereof.

C and D of Chemical Formula 1 may independently be a substituted or unsubstituted methyl group, a substituted or unsubstituted ethyl group, a substituted or unsubstituted propyl group, a substituted or unsubstituted butyl group, a substituted or unsubstituted pentyl group, a substituted or unsubstituted hexyl group, or a combination thereof, but are not limited thereto.

For example, m may be an integer of 4 or more, for example, 4 to 100, 4 to 75, 4 to 50, or 4 to 40.

Accordingly, it is possible to impart sufficient adhesion to apply the antifouling coating composition including the copolymer to various solid surfaces.

The linking group connecting two or more moieties represented by Chemical Formula 1 may be a polymer having hydrophilicity.

For example, the linking group may be a polymer including a substituted or unsubstituted C1 to C20 heteroaliphatic hydrocarbon, for example, a polymer including a substituted or unsubstituted C1 to C20 heteroaliphatic hydrocarbon including at least one oxygen atom.

For example, the linking group may include a substituted or unsubstituted polyalkylene glycol, and for example, the linking group may include a structural unit represented by Chemical Formula 2.

When the copolymer includes the aforementioned linking group, it can not only have excellent hydrophilicity, but can also have biocompatibility, and thus, may be applied as a coating material that imparts antifouling properties to medical devices, such as medical devices for insertion into a living body.

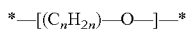  [Chemical Formula 2]

In Chemical Formula 2, n is an integer of 2 to 4, and

* is a linking point.

For example, in Chemical Formula 2, n may be 2 or 3, but desirably n may be 2.

Specifically, the linking group may include polyethylene glycol, polypropylene glycol, methoxypolyethylene glycol, ethoxypolyethylene glycol, propoxy polyethylene glycol, methoxy polypropylene glycol, ethoxy polypropylene glycol, propoxy polypropylene glycol, or a combination thereof.

The linking group may include 10 to 1500 structural units represented by Chemical Formula 2.

For example, it may include 30 to 1000, for example, 50 to 750, 80 to 600, or 100 to 500 structural units, but is not limited thereto.

A weight average molecular weight of the linking group may be about 500 g/mol to about 50,000 g/mol, for example, about 1000 g/mol to about 50,000 g/mol, about 2000 g/mol to about 40,000 g/mol, about 2500 g/mol to g/mol about 30,000 g/mol, or about 2000 g/mol to about 20,000 g/mol.

When the linking group has a weight average molecular weight within the range, it may be attached on the solid surface with an appropriate density to express excellent antifouling properties.

The copolymer according to an embodiment may include two moieties represented by Chemical Formula 1 (moiety A), and may include one linking group (moiety B) connecting the two moieties represented by Chemical Formula 1.

That is, the copolymer may be an ABA-type triblock copolymer.

The moiety (moiety A) represented by Chemical Formula 1 in the ABA-type triblock copolymer has excellent adhesion properties to the solid surface as described above, and the one linking group (moiety B) connecting the two moieties represented by Chemical Formula 1 is not attached onto the solid surface, so the ABA-type triblock copolymer may be attached to the solid surface in a loop shape.

Figure 1B:
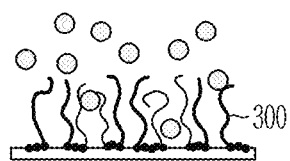
FIG. 1B is a schematic view showing that biological polluting materials 200 are present on a substrate coated with an antifouling composition including the conventional brush-shaped polymer 300.
Figure 1C:
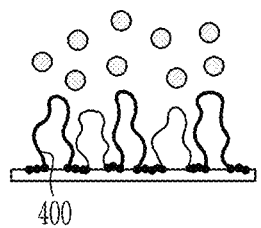
FIG. 1C is a schematic view showing that biological polluting materials are present on a substrate coated with an antifouling composition including a loop-shaped polymer 400 according to an embodiment of the present invention.

FIG. 1(a) schematically shows that biological polluting materials 200 are present on a substrate 100 which is not coated with an antifouling composition;

FIG. 1(b) schematically shows that biological polluting materials 200 are present on a substrate coated with an antifouling composition including the conventional brush-shaped polymer 300; and FIG. 1(c) schematically shows that biological polluting materials are present on a substrate coated with an antifouling composition including a loop-shaped polymer 400 according to an embodiment of the present invention.

Since the ABA-type triblock copolymer is attached onto the solid surface in a loop shape, the adhesion to the solid surface is more excellent than in the AB-type diblock copolymer having a moiety (moiety A) represented by Chemical Formula 1 attached to the solid surface in a brush-shape, and may more effectively prevent the adsorption of microorganisms, biomaterials, proteins, and the like.

For example, the copolymer may be represented by Chemical Formula 1-1.

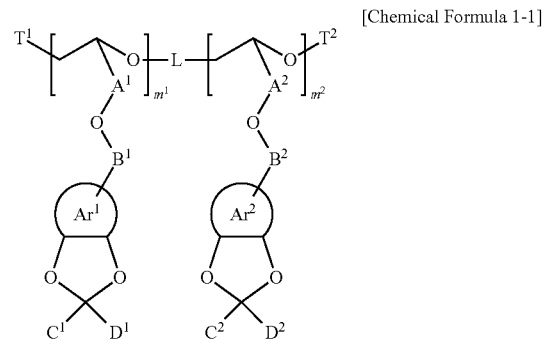  [Chemical Formula 1-1]

In Chemical Formula 1-1, $Ar^1$ and $Ar^2$ are the same or different and are independently a substituted or unsubstituted C6 to C16 aromatic hydrocarbon ring, $A^1$, $A^2$, $B^1$, and $B^2$ are the same or different and are independently a single bond, a substituted or unsubstituted C1 to C3 aliphatic hydrocarbon group, a substituted or unsubstituted C3 to C16 alicyclic hydrocarbon group, a substituted or unsubstituted C6 to C20 aromatic hydrocarbon group, a substituted or unsubstituted C1 to C20 heteroalicyclic hydrocarbon group, $-S-$, $-SO_2-$, $-(CR^aR^b)(NR^cR^d)$, or a combination thereof, wherein $R^a$ to $R^d$ are respectively the same as in Chemical Formula 1, $C^1$, $C^2$, $D^1$, $D^2$, $T^1$, and $T^2$ are the same or different and are independently hydrogen, a hydroxy group, a substituted or unsubstituted C1 to C20 aliphatic hydrocarbon group, a substituted or unsubstituted C1 to C20 heteroaliphatic hydrocarbon group, a substituted or unsubstituted C3 to C20 alicyclic hydrocarbon group, a substituted or unsubstituted C1 to C20 heteroalicyclic hydrocarbon group, a substituted or unsubstituted C6 to C20 aromatic hydrocarbon group, a substituted or unsubstituted C2 to C20 hetero aromatic hydrocarbon group, or a combination thereof, $m^1$ and $m^2$ are the same or different and are independently an integer of 4 or more, and L is a divalent group including the structural unit represented by Chemical Formula 2, wherein Chemical Formula 2 is the same as described above.

For example, $Ar^1$ and $Ar^2$ may independently be a substituted or unsubstituted benzene or a substituted or unsubstituted polycyclic aromatic hydrocarbon, wherein the polycyclic aromatic hydrocarbon may be a non-condensed aromatic ring, a condensed aromatic ring, or a combination thereof.

Specifically, $Ar^1$ and $Ar^2$ may independently be a substituted or unsubstituted benzene, a substituted or unsubstituted naphthalene, a substituted or unsubstituted anthracene, a substituted or unsubstituted phenanthrene, a substituted or unsubstituted pyrene, or a combination thereof, but are not limited thereto.

For example, $A^1$, $A^2$, $B^1$, and $B^2$ may independently be a substituted or unsubstituted C1 to C3 alkylene group, a substituted or unsubstituted C2 or C3 alkenylene group, or a combination thereof.

Specifically, $A^1$, $A^2$, $B^1$, and $B^2$ may independently be a substituted or unsubstituted methylene group, a substituted or unsubstituted ethylene group, a substituted or unsubstituted propylene group, or a combination thereof, but are not limited thereto.

For example, $B^1$ and $B^2$ may have more carbon atoms than $A^1$ and $A^2$. For example, $A^1$ and $A^2$ may independently be a substituted or unsubstituted methylene group, and $B^1$ and $B^2$ may independently be a substituted or unsubstituted ethylene group or a substituted or unsubstituted propylene group.

For example, $C^1$, $C^2$, $D^1$, and $D^2$ may independently be a substituted or unsubstituted C1 to C20 aliphatic hydrocarbon group, wherein the substituted or unsubstituted C1 to C20 aliphatic hydrocarbon group is the same as described above.

Specifically, $C^1$, $C^2$, $D^1$, and $D^2$ may independently be a substituted or unsubstituted methyl group, a substituted or unsubstituted ethyl group, a substituted or unsubstituted propyl group, a substituted or unsubstituted butyl group, a substituted or unsubstituted pentyl group, a substituted or unsubstituted hexyl group, or a combination thereof, but are not limited thereto.

For example, $T^1$ and $T^2$ may independently be hydrogen, a hydroxy group, a substituted or unsubstituted C1 to C20 heteroaliphatic hydrocarbon group, or a combination thereof.

For example, at least one of $T^1$ and $T^2$ may be hydrogen or a hydroxy group, and for example, $T^1$ and $T^2$ may independently be hydrogen or a hydroxy group. For example, $T^1$ may be a hydroxy group and $T^2$ may be hydrogen.

For example, $m^1$ and $m^2$ may each be an integer of 4 to 100, for example, 4 to 75, 4 to 50, or 4 to 40.

For example, $Ar^1$ and $Ar^2$ may be the same, $A^1$ and $A^2$ may be same, $B^1$ and $B^2$ may be the same, $C^1$, $C^2$, $D^1$, and $D^2$ may be the same, and $m^1$ and $m^2$ may be the same.

For example, the linking group may include 10 to 1500 structural units represented by Chemical Formula 2.

For example, it may include 30 to 1000, for example, 50 to 750, 80 to 600, or 100 to 500 structural units, but is not limited thereto.

For example, a weight average molecular weight of L may be about 500 g/mol to about 50,000 g/mol, for example, about 1000 g/mol to about 50,000 g/mol, about 2000 g/mol to about 40,000 g/mol, about 2500 g/mol to about 30,000 g/mol, or about 2000 g/mol to about 20,000 g/mol.

For example, a number average molecular weight of the copolymer may be about 1000 g/mol to about 70,000 g/mol, for example, about 3000 g/mol to about 50,000 g/mol, about 5000 g/mol to about 35,000 g/mol, or about 6000 to about 30,000 g/mol.

For example, polydispersity of the copolymer may be about 1 to about 2, and desirably about 1 to about 1.5.

Meanwhile, the solvent included in the antifouling coating composition is not particularly limited as long as it has sufficient solubility or dispersibility in the copolymer, but may be, for example, water, methanol, ethanol, or a combination thereof.

The copolymer may be included in the antifouling coating composition at a concentration of about 0.1 mg/ml to about 10 mg/ml.

Within the content range, it is possible to control a thickness, a surface roughness, and a planarization degree of an antifouling coating film.

The antifouling coating composition may further include a catalyst that will be described later, and the antifouling coating composition may further include other compounds in addition to the aforementioned copolymer, solvent, and additive.

Another embodiment of the present invention provides a method of preparing the copolymer.

A method of preparing the copolymer according to an embodiment includes reacting a substituted or unsubstituted polyalkylene glycol with an organic base catalyst including a substituted or unsubstituted C3 to C20 branched alkyl group, and a compound represented by Chemical Formula 3.

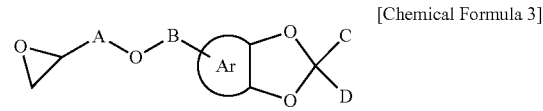

[Chemical Formula 3]

In Chemical Formula 3, Ar, A, B, C, and D are the same as defined in Chemical Formula 1.

For example, the substituted or unsubstituted polyalkylene glycol may include the aforementioned structural unit represented by Chemical Formula 2.

For example, the substituted or unsubstituted polyalkylene glycol may be polyethylene glycol, polypropylene glycol, methoxypolyethylene glycol, ethoxypolyethylene glycol, propoxy polyethylene glycol, methoxy polypropylene glycol, ethoxy polypropylene glycol, propoxy polypropylene glycol, or a combination thereof.

For example, a weight average molecular weight of the substituted or unsubstituted polyalkylene glycol may be about 500 g/mol to about 50,000 g/mol, for example, about 1000 g/mol to about 50,000 g/mol, about 2000 g/mol to about 40,000 g/mol, about 2500 g/mol to g/mol about 30,000 g/mol, or about 2000 g/mol to about 20,000 g/mol.

The organic base catalyst including the substituted or unsubstituted C3 to C20 branched alkyl group may be a bulky base having low nucleophilicity, so the copolymer may be synthesized without a side reaction.

For example, when employing the organic base catalyst including the substituted or unsubstituted C3 to C20 branched alkyl group, it may reduce deviation of a substituted or unsubstituted acetonide group (*—O—C(C)(D)-O*) of the compound represented by Chemical Formula 3.

On the other hand, without being bounded to specific theory, when a strong base having high nucleophilicity is used as a base catalyst (i.e. CsOH), it may cause a side reaction deviating a substituted or unsubstituted acetonide group of the compound represented by Chemical Formula 3 during the polymerization process, so the storage stability of the obtained copolymer may be deteriorated.

In addition, by using an organic base including the substituted or unsubstituted C3 to C20 branched alkyl group, the substituted or unsubstituted polyalkylene glycol, and the organic base catalyst including a substituted or unsubstituted C3 to C20 branched alkyl group, the compound represented by Chemical Formula 3 may be reacted at a low temperature, for example, about 20° C. to about 65° C., about 25° C. to about 65° C., or about 30° C. to about 65° C.

Since the reaction is performed at a low temperature within the range, it may further reduce the side reaction deviating the substituted or unsubstituted acetonide group of the compound represented by Chemical Formula 3, and may further improve storage stability of the antifouling coating composition including the copolymer.

For example, the organic base catalyst including the substituted or unsubstituted C3 to C20 branched alkyl group may be a phosphazene-based base, and for example, the organic base catalyst including the substituted or unsubstituted C3 to C20 branched alkyl group may be represented by Chemical Formula 4.

[Chemical Formula 4]

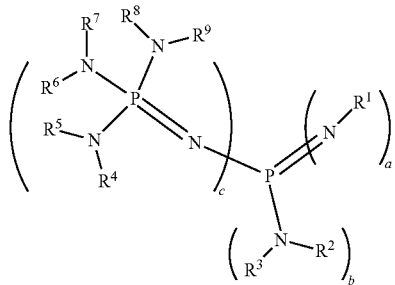

In Chemical Formula 4, $R^1$ to $R^9$ may independently be a substituted or unsubstituted C1 to C20 alkyl group, a substituted or unsubstituted C3 to C30 cycloalkyl group, or a combination thereof, or at least adjacent two of $R^1$ to $R^9$ are linked to each other to form a ring, at least one of $R^1$ to $R^9$ is a substituted or unsubstituted C3 to C20 branched alkyl group, and a to c are independently an integer of 0 to 5, provided that the sum of 2a, b, and c is 5.

For example, the substituted or unsubstituted C1 to C20 alkyl group may be a substituted or unsubstituted C1 to C20 linear alkyl group, a substituted or unsubstituted C3 to C20 branched alkyl group, or a combination thereof.

The substituted or unsubstituted C1 to C20 linear alkyl group may be a substituted or unsubstituted methyl group, a substituted or unsubstituted ethyl group, a substituted or unsubstituted n-propyl group, a substituted or unsubstituted n-butyl group, a substituted or unsubstituted n-pentyl group, a substituted or unsubstituted n-hexyl group, a substituted or unsubstituted n-heptyl group, a substituted or unsubstituted n-octyl group, or a combination thereof.

In addition, the substituted or unsubstituted branched C3 to C20 alkyl group may be a substituted or unsubstituted C3 to C20 iso-alkyl group, a substituted or unsubstituted C3 to C20 sec-alkyl group, a substituted or unsubstituted C4 to C20 tert-alkyl group, or a substituted or unsubstituted C5 to C20 neo-alkyl group.

For example, the substituted or unsubstituted C3 to C20 branched alkyl group may be a substituted or unsubstituted iso-propyl group, a substituted or unsubstituted iso-butyl group, a substituted or unsubstituted sec-butyl group, a substituted or unsubstituted tert-butyl group, a substituted or unsubstituted iso-pentyl group, a substituted or unsubstituted sec-pentyl group, a substituted or unsubstituted tert-pentyl group, or a substituted or unsubstituted neo-pentyl group, and desirably a substituted or unsubstituted iso-propyl group, a substituted or unsubstituted sec-butyl group, or a combination thereof.

For example, the substituted or unsubstituted C3 to C30 cycloalkyl group may be a substituted or unsubstituted cyclopropyl group, a substituted or unsubstituted cyclobutyl group, a substituted or unsubstituted cyclopentyl group, a substituted or unsubstituted cyclohexyl group, a substituted or unsubstituted cycloheptyl group, a substituted or unsubstituted cyclooctyl group, or a combination thereof.

For example, at least one of $R^1$ to $R^9$ may be a substituted or unsubstituted C3 to C20 branched alkyl group, wherein the substituted or unsubstituted C3 to C20 branched alkyl group may be the same as described above.

For example, at least one of $R^1$ to $R^9$ may be a substituted or unsubstituted C1 to C20 linear alkyl group, wherein the substituted or unsubstituted C1 to C20 linear alkyl group is the same as described above.

For example, at least one of $R^1$ to $R^9$ may be a substituted or unsubstituted C3 to C20 branched alkyl group and the rest thereof may be a substituted or unsubstituted C3 to C20 linear alkyl group, wherein the substituted or unsubstituted C3 to C20 branched alkyl group and the substituted or unsubstituted C1 to C20 linear alkyl group may each be the same as described above.

For example, $R^1$ may be a substituted or unsubstituted C3 to C20 branched alkyl group, wherein the substituted or unsubstituted C3 to C20 branched alkyl group is the same as described above.

For example, $R^2$ to $R^9$ may be a substituted or unsubstituted C1 to C20 linear alkyl group, wherein the substituted or unsubstituted C1 to C20 linear alkyl group is the same as described above.

For example, a may be 1 or 2, and for example, b and c may each independently be an integer of 0 to 3.

However, as described above, a, b, and c satisfy 2a+b+c=5, for example, a is 1, b is 3, and c is 0; a is 1, b is 2, and c is 1; a is 1, b is 1, and c is 2; or a is 1, b is 0, and c is 3.

Another embodiment provides an antifouling film produced from the aforementioned antifouling coating composition.

The antifouling film may be an organic film including non-toxic materials and may be employed for a coating material providing antifouling properties to a medical device, for example, a medical device for in vivo insertion equipment since it has biocompatibility and hydrophilicity.

The antifouling film may be formed by a solution process, and may be formed on a surface requiring antifouling coating by, for example, spin coating, slit coating, inkjet printing, nozzle printing, spraying, and/or doctor blade coating, but is not limited thereto.

The antifouling film may be treated with an acid catalyst before coating the antifouling coating composition on the surface.

Accordingly, the acid catalyst detaches the substituted or unsubstituted acetonide group (*—OC(C)(D)-O*) from the moiety represented by Chemical Formula 1 of the copolymer and forms a hydroxyl group, so that the copolymer may have adhesion properties to a solid surface.

The acid catalysts include hydrochloric acid (HCl in $H_2O$), zirconium tetrachloride ($ZrCl_4$), aqueous tert-butyl hydroperoxide, indium trichloride, trifluoroacetic acid ($CF_3CO_2H$), perchloric acid ($HClO_4$), para-toluene sulfonic acid (p-TsOH), or a combination thereof, but is not limited thereto.

The acid catalyst may be included at about 1 to about 10 wt % based on the total volume of the antifouling coating composition, for example, about 2 to about 5 wt %, but is not limited thereto.

When the acid catalyst treatment is performed, a substituted or unsubstituted acetone may be formed from the substituted or unsubstituted acetonide group detached from the copolymer, and the produced acetone may be removed by treating the antifouling coating composition with an acid catalyst and then heating and evaporating the same.

The antifouling coating composition is treated with the acid catalyst and then coated after purifying or without purifying the same to provide an antifouling film, but the antifouling film may be more uniformly coated when it is coated after being purified.

The purifying method is not particularly limited, but for example, may include heating the composition to evaporate a solvent, and then dissolving and/or dispersing the remaining precipitate again into the solvent.

Hereinafter, specific embodiments of the present invention are presented.

However, the examples described below are only intended to specifically illustrate or describe the present invention, and thus the present invention should not be limited thereto.

Figure 2:
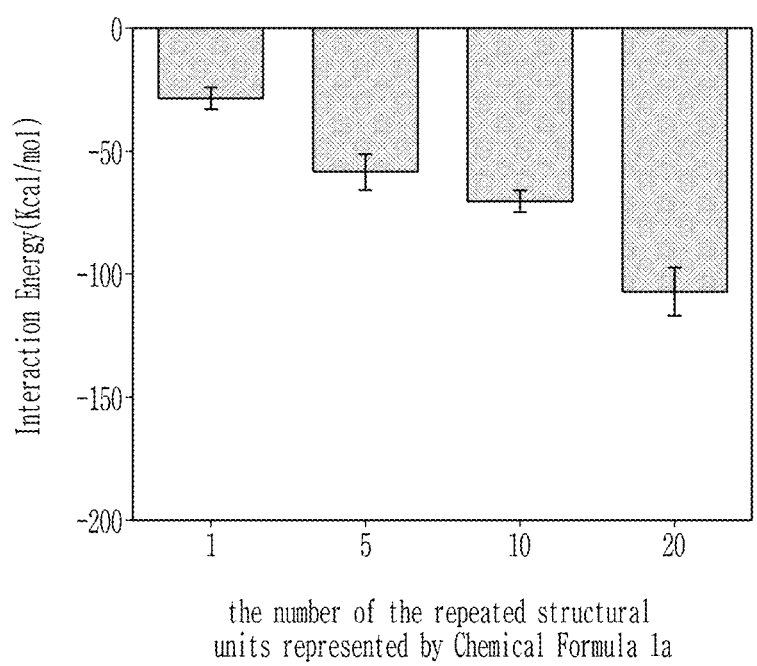

Evaluation 1. Simulation Evaluation (1) FIG. 2 shows a molecular dynamic simulation of the interactive energy between the solid surface and the polymer in which the repeated number of the structural units represented by Chemical Formula 1a is 1, 5, 10, and 20.

It is confirmed that the cases in which the repeated number of the structural units represented by Chemical Formula 1a is 5, 10, and 20 have sufficient negative interactive energy for the solid surface, comparing to the case in which the repeated number of the structural units represented by Chemical Formula 1a is 1.

In other words, it is confirmed that the polymers having the repeated number of the structural units represented by Chemical Formula 1a of 5, 10, and 20 have enhanced interaction with the solid surface and improved bonding affinity, comparing to the polymer having the repeated number of the structural unit represented by Chemical Formula 1a of 1.

[Chemical Formula 1a]

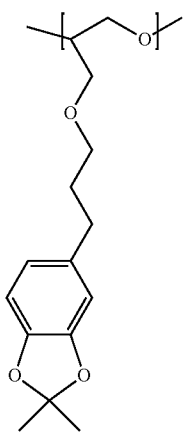

Synthesis of Copolymers

Synthesis Example 1: ABA-type Triblock Copolymer 1

Polyethylene glycol (0.1 mmol, 0.4 g, 1 equivalent) having a weight average molecular weight of 4000 g/mol is added into 0.3 ml of toluene and dissolved by heating at 60° C.

A 1-tert-butyl-4,4,4-tris(dimethylamino)-2,2-bis[tris(dimethylamino)-phosphoranylidenamino]-2λ$^5$,4λ$^5$-catenadi (phosphazene) solution (t-Bu-P$_4$, 0.8M in hexane, 0.2 mmol, 0.25 mL, 2 equivalents) is added thereto and reacted for 30 minutes and added with a compound (0.528 g, 2 mmol) represented by Chemical Formula 3a and reacted at 60° C.

for 12 hours and then added with an excess amount of benzoic acid to complete the reaction.

Then it is filtered by an alumina filter to remove t-Bu-P$_4$ and precipitated with 1 L of a hexane/diethylether mixed solvent (volume ratio of 1:1) for a total of 2 times to remove the remaining reactant and impurity, and then dried to provide an ABA-type Triblock Copolymer 1.

The ABA-type Triblock Copolymer 1 is represented by Chemical Formula 1-1-1, wherein x=7, y=7, and z=91 in Chemical Formula 1-1-1.

($M_{n,\ ^1H\ NMR}$=7400 g/mol, $M_{n,GPC}$=4850 g/mol, PDI (polydispersity index)=1.03)

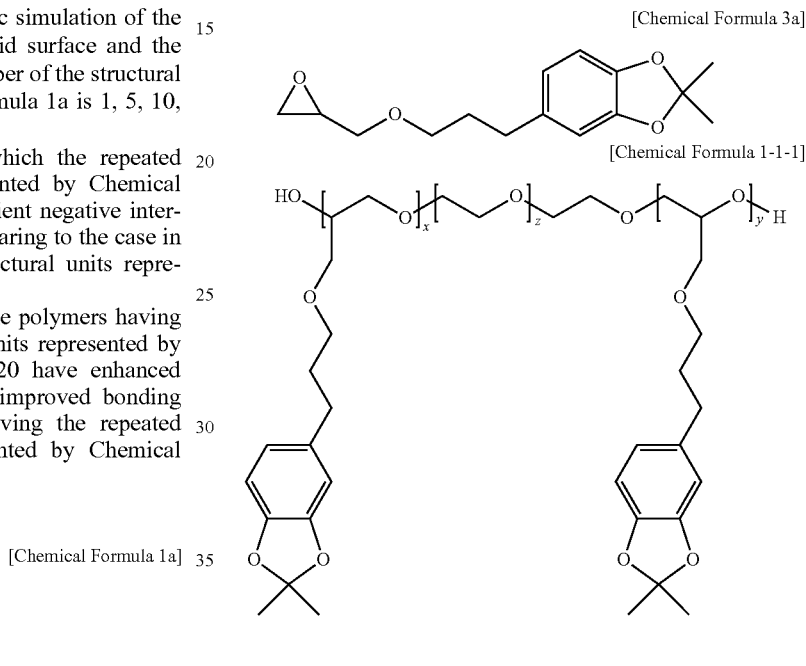

[Chemical Formula 3a]

[Chemical Formula 1-1-1]

Synthesis Example 2: ABA-type Triblock Copolymer 2

An ABA-type Triblock Copolymer 2 is prepared in accordance with the same procedure as in Synthesis Example 1, except that polyethylene glycol (0.1 mmol, 1 g, 1 equivalent) having a weight average molecular weight of 10,000 g/mol is used instead of polyethylene glycol (0.1 mmol, 0.4 g, 1 equivalent) having a weight average molecular weight of 4000 g/mol, and a compound (0.264 g, 1 mmol) represented by Chemical Formula 3a is used instead of the compound (0.528 g, 2 mmol) represented by Chemical Formula 3a.

The ABA-type Triblock Copolymer 2 is represented by Chemical Formula 1-1-1, and in Chemical Formula 1-1-1, x=4, y=4, and z=227.

($M_{n,\ ^1H\ NMR}$=11,850 g/mol, $M_{n,\ GPC}$=10,900 g/mol, PDI=1.10)

Synthesis Example 3: ABA-type Triblock Copolymer 3

An ABA-type Triblock Copolymer 3 is prepared in accordance with the same procedure as in Synthesis Example 1, except that polyethylene glycol (0.1 mmol, 1 g, 1 equivalent) having a weight average molecular weight of 10,000 g/mol is used instead of polyethylene glycol (0.1 mmol, 0.4 g, 1 equivalent) having a weight average molecular weight of 4000 g/mol.

The ABA-type Triblock Copolymer 3 is represented by Chemical Formula 1-1-1, and in Chemical Formula 1-1-1, x=9, y=9, and z=227.

($M_{n,\ 1H\ NMR}$=14,550 g/mol, $M_{n,\ GPC}$=13,640 g/mol, PDI=1.08)

Synthesis Example 4: ABA-type Triblock Copolymer 4

An ABA-type Triblock Copolymer 4 is prepared in accordance with the same procedure as in Synthesis Example 1, except that polyethylene glycol (0.1 mmol, 1 g, 1 equivalent) having a weight average molecular weight of 10,000 g/mol is used instead of polyethylene glycol (0.1 mmol, 0.4 g, 1 equivalent) having a weight average molecular weight of 4000 g/mol, and a compound (0.792 g, 3 mmol) represented by Chemical Formula 3a is used instead of the compound (0.528 g, 2 mmol) represented by Chemical Formula 3a.

The ABA-type Triblock Copolymer 4 is represented by Chemical Formula 1-1-1, and in Chemical Formula 1-1-1, x=12, y=12, and z=227.

($M_{n,\ 1H\ NMR}$=17,290 g/mol, $M_{n,\ GPC}$=14,940 g/mol, PDI=1.32)

Synthesis Example 5: ABA-type Triblock Copolymer 5

An ABA-type Triblock Copolymer 5 is prepared in accordance with the same procedure as in Synthesis Example 1, except that polyethylene glycol (0.1 mmol, 2 g, 1 equivalent) having a weight average molecular weight of 20,000 g/mol is used instead of polyethylene glycol (0.1 mmol, 0.4 g, 1 equivalent) having a weight average molecular weight of 4000 g/mol.

The ABA-type Triblock Copolymer 5 is represented by Chemical Formula 1-1-1 and in Chemical Formula 1-1-1, x=9, y=9, and z=453.

($M_{n,\ 1H\ NMR}$=24,500 g/mol, $M_{n,\ GPC}$=22,700 g/mol, PDI=1.04)

Comparative Synthesis Example 1: AB-type Diblock Copolymer 1

0.3 ml of methoxypolyethylene glycol (1 g, 0.2 mmol, 1 equivalent) having a weight average molecular weight of 5000 g/mol is added into 0.3 ml of toluene and dissolved by heating at 60° C.

A t-Bu-P$_4$ solution (0.8 M in hexane, 0.2 mmol, 0.25 mL, 1 equivalent) is added thereto and reacted for 30 minutes and added with the compound (0.264 g, 1 mmol) represented by Chemical Formula 3a and reacted at 60° C. for 12 hours and then added with benzoic acid to complete the reaction.

Subsequently, it is filtered by an alumina filter to remove t-Bu-P$_4$, and precipitated by 1 L of a hexane/diethylether mixed solvent (volume ratio of 1:1) 2 times to remove the remaining reactant and impurity and dried to provide an AB-type Diblock Copolymer 1.

The AB-type Diblock Copolymer 1 is represented by Chemical Formula A, and in Chemical Formula A, v=4 and w=114.

($M_{n,\ 1H\ NMR}$=5930 g/mol, $M_{n,\ GPC}$=5390 g/mol, PDI (polydispersity index)=1.09)

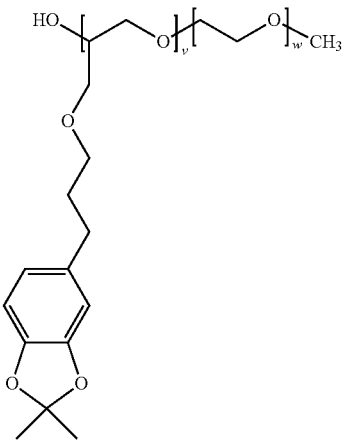

[Chemical Formula A]

Comparative Synthesis Example 2: AB-type Diblock Copolymer 2

An AB-type Diblock Copolymer 2 is prepared in accordance with the same procedure as in Comparative Synthesis Example 1, except that a compound (0.528 g, 2 mmol) represented by Chemical Formula 3a is used instead of the compound (0.264 g, 1 mmol) represented by Chemical Formula 3a.

Figure 3:
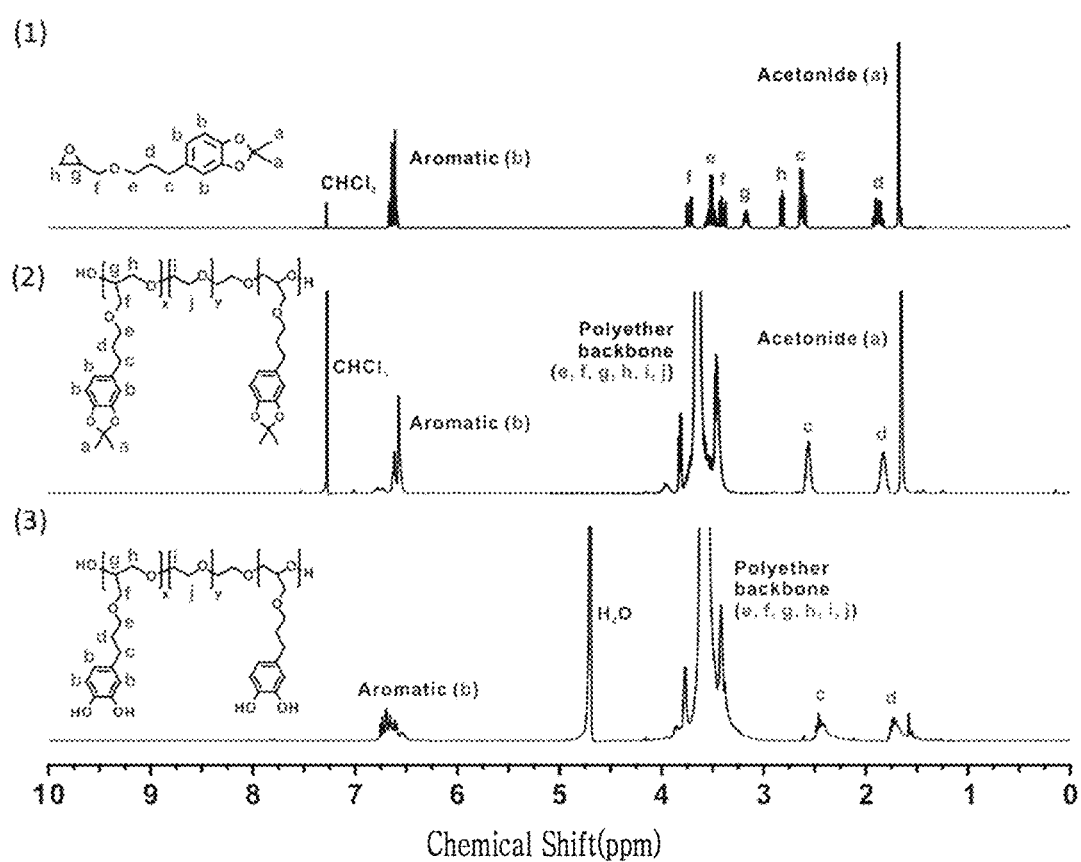
FIG. 3 (1) shows a $^1H$ NMR spectrum of the compound represented by Chemical Formula 3a, FIG. 3 (2) shows a $^1H$ NMR spectrum of an ABA-type triblock copolymer 3 according to Synthesis Example 3, and FIG. 3 (3) shows a $^1H$ NMR spectrum after treatment of an ABA-type triblock copolymer 3 according to Synthesis Example 3 with hydrochloric acid.

FIG. 3 shows a $^1$H NMR spectrum of the AB-type Diblock Copolymer 2.

The AB-type Diblock Copolymer 2 is represented by Chemical Formula A, and in Chemical Formula A, v=9 and w=114.

($M_{n,\ 1H\ NMP}$=7370 g/mol, $M_{n,\ GPC}$=6890 g/mol, PDI (polydispersity index)=1.12)

Comparative Synthesis Example 3: AB-type Diblock Copolymer 3

An AB-type Diblock Copolymer 3 is prepared in accordance with the same procedure as in Comparative Synthesis Example 1, except that a compound (0.792 g, 3 mmol) represented by Chemical Formula 3a is used instead of the compound (0.264 g, 1 mmol) represented by Chemical Formula 3a.

The AB-type Diblock Copolymer 3 is represented by Chemical Formula A, and in Chemical Formula A, v=12 and w=114.

($M_{n,\ 1H\ NMR}$=8960 g/mol, $M_{n,\ GPC}$=6980 g/mol, PDI (polydispersity index, Ð)=1.14)

Evaluation 2: $^1$H-NMR Spectrum 1

FIG. 3 (1) shows a $^1$H NMR spectrum of the compound represented by Chemical Formula 3a, FIG. 3 (2) shows a $^1$H NMR spectrum of the ABA-type Triblock Copolymer 3 according to Synthesis Example 3, and FIG. 3 (3) shows a $^1$H NMR spectrum after treatment of the ABA-type Triblock Copolymer 3 according to Synthesis Example 3 with hydrochloric acid.

Referring to FIG. 3 (1), it is confirmed that the compound represented by Chemical Formula 3a shows a signal by an aromatic ring at 6.59-6.47 ppm, shows a signal by glycidyl ether at 3.63-3.08 ppm, and shows a signal by an acetonide group at 1.58 ppm.

In the spectrum of FIG. 3 (2), the signal by glycidyl ether at 3.63-3.08 ppm is disappeared, a signal of a polyether chain is appeared, and the signal by the acetonide group at 1.58 ppm is maintained.

Referring to FIG. 3 (2), it is confirmed that the ABA-type Triblock Copolymer 3 is synthesized by anion ring-opening polymerization without deviating an acetonide group and the side reaction in the polymerization.

Referring to FIG. 3 (3), it is confirmed that the signal from the methyl group at 1.58 ppm is disappeared when the ABA-type Triblock Copolymer 3 is treated with hydrogen chloride to deviate an acetonide group.

Summarizing, the reaction may be performed even at a low temperature of 60° C. when using t-Bu-P$_4$ base, so it is confirmed that the ABA-type Triblock Copolymer 3 is synthesized without deviating an acetonide group and without a side reaction during the polymerization.

Thus, when using the bulky t-Bu-P$_4$ base having low nucleophilicity, a polymer may be synthesized even at a low temperature, compared with the case of using a non-bulky metal base (i.e. CsOH) having high nucleophilicity, and the produced polymer may have excellent storage stability.

Preparation of Antifouling Coating Composition

Antifouling coating compositions according to Examples 1 to 5 and Comparative Examples 1 to 3 are prepared by adding 100 mg of the ABA-type Triblock Copolymers 1 to 5 and AB-type Diblock Copolymers 1 to 3 obtained from Synthesis Examples 1 to 5 and Comparative Synthesis Examples 1 to 3 into a mixed solution of a 32 wt % hydrochloric acid solution (0.8 mL) and methanol (9.2 mL).

Evaluation 3. Surface Modification

While the antifouling coating compositions according to Example 3 and Comparative Example 2 are agitated in an open state under air for 3 hours, acetone produced in the composition is evaporated, then a solvent is removed by a rotatory evaporator, and it is dried in a vacuum oven to precipitate a precipitate that is concentrated by cold diethyl ether.

Each precipitate is dissolved in methanol at a concentration of 10 mg/ml to provide antifouling coating compositions according to Example 3-1 and Comparative Example 2-1.

The antifouling coating compositions according to Example 3-1 and Comparative Example 2-1 are each coated on cleaned SiO$_2$, polystyrene (PS), poly(ether ether ketone) (PEEK), acrylate, poly(ethylene terephthalate) (PET), TiO$_2$, gold, and glass substrates.

Subsequently, after incubating the same at room temperature for 1 hour, it is washed with methane 3 times and dried by nitrogen to provide a substrate coated with an antifouling film.

Figure 4:
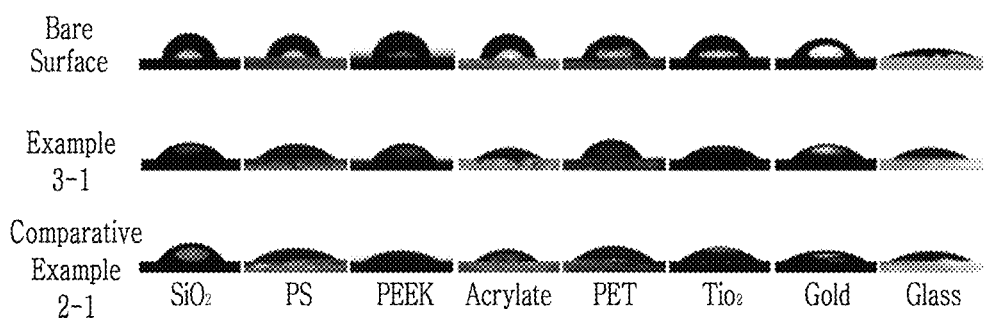
FIG. 4 is a side view of a contact angle on a side surface after dripping water droplets on a substrate which is not coated with an antifouling coating composition (upper) or each of a variety of types of substrates coated with antifouling coating compositions according to Example 3-1 (middle) or Comparative Example 2-1 (lower).

FIG. 4 is a view of a contact angle on a side surface after dripping one water droplet onto each of the various substrates which are not coated with the antifouling coating composition or substrates coated with the antifouling coating composition according to Example 3-1 or Comparative Example 2-1.

Figure 5:
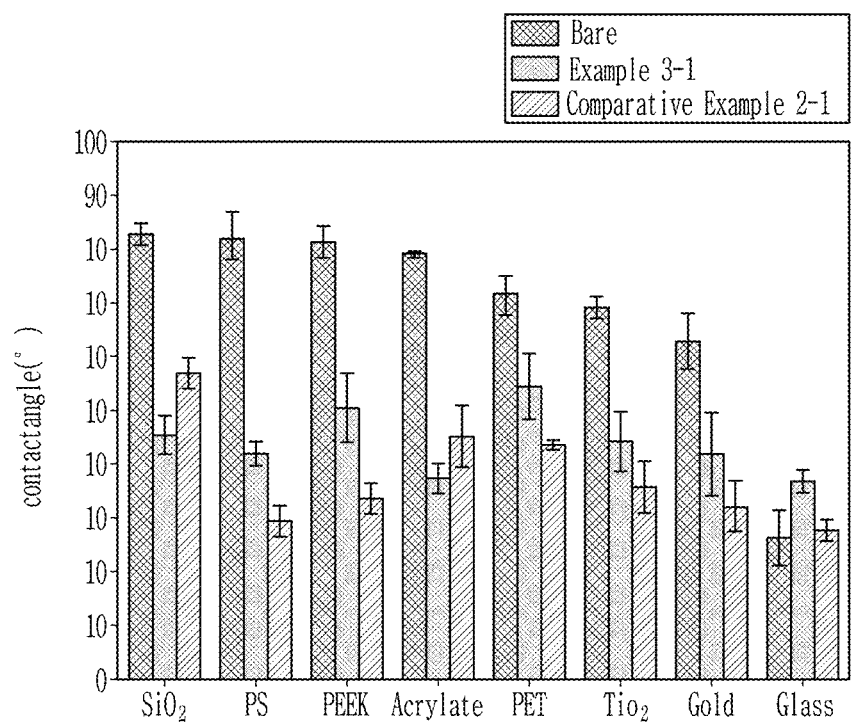
FIG. 5 is a graph showing an average obtained by repeatedly measuring a static contact angle of the water droplet five times and a standard deviation for an error range, after dripping water droplets on a variety of substrates which are not coated or are coated with the antifouling coating compositions of Example 3-1 and Comparative Example 2-1.

FIG. 5 is a graph showing an average obtained by measuring a static contact angle of the water droplet dripped on each substrate 5 times with an error range of a standard derivation.

Referring to FIGS. 4 and 5, it is confirmed that the substrate coated with the antifouling coating composition according to Example 3-1 has a lower contact angle even on the substrate having relative hydrophobicity and a higher contact angle on the substrate having a hydrophilic surface than the substrates which are not coated with the antifouling coating composition and are coated with the antifouling coating composition according to Comparative Example 2-1.

Thereby, it is confirmed that the various substrates are uniformly coated with the antifouling coating composition according to Example 3-1.

Evaluation 4. Evaluation of Coating and Antifouling Properties

Using a sensor (QSX 301) coated with gold, real-time surface adsorption of a polymer and a protein is measured.

After evaporating acetone produced in the composition while the antifouling coating compositions according to Examples 1 to 5 and Comparative Examples 1 to 3 are agitated in an open state under the air for 3 hours, a solvent is removed by a rotation evaporator, and it is dried in a vacuum oven to precipitate a precipitate concentrated by diethyl ether.

Each precipitate is dispersed in water at a concentration of 1.0 g/ml to provide antifouling coating compositions according to Examples 1-2 to 5-2 and Comparative Examples 1-2 to 3-2.

The sensor is equilibrated by 10 mM of PBS (phosphate-buffered saline) and injected with each of the antifouling coating compositions according to Examples 1-2 to 5-2 and Comparative Examples 1-2 to 3-2 at 0.6 mL/min for 30 minutes.

Figure 6A:
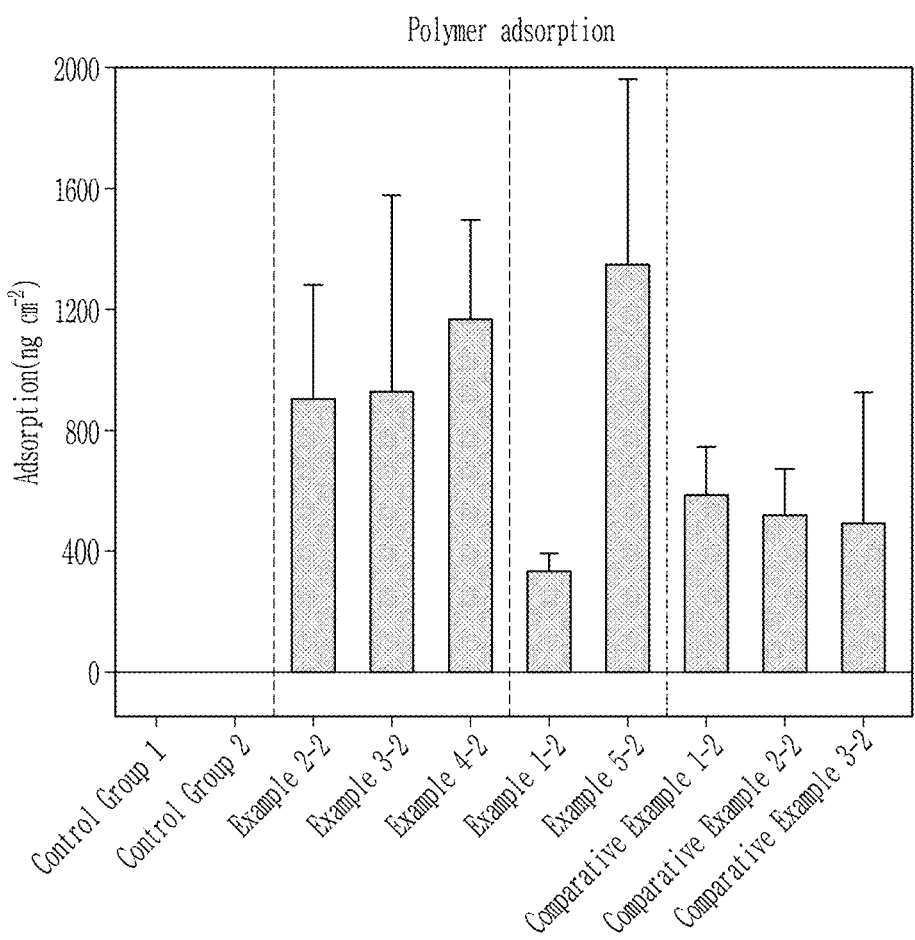
FIG. 6A is a graph showing copolymer adsorption of a solid surface when the solid surface is treated with antifouling coating compositions according to Examples 1-2 to 5-2 and Comparative Examples 1-2 to 3-2.

Then it is washed with water for 30 minutes, and copolymer adsorption is measured and shown in FIG. 6A.

Figure 6B:
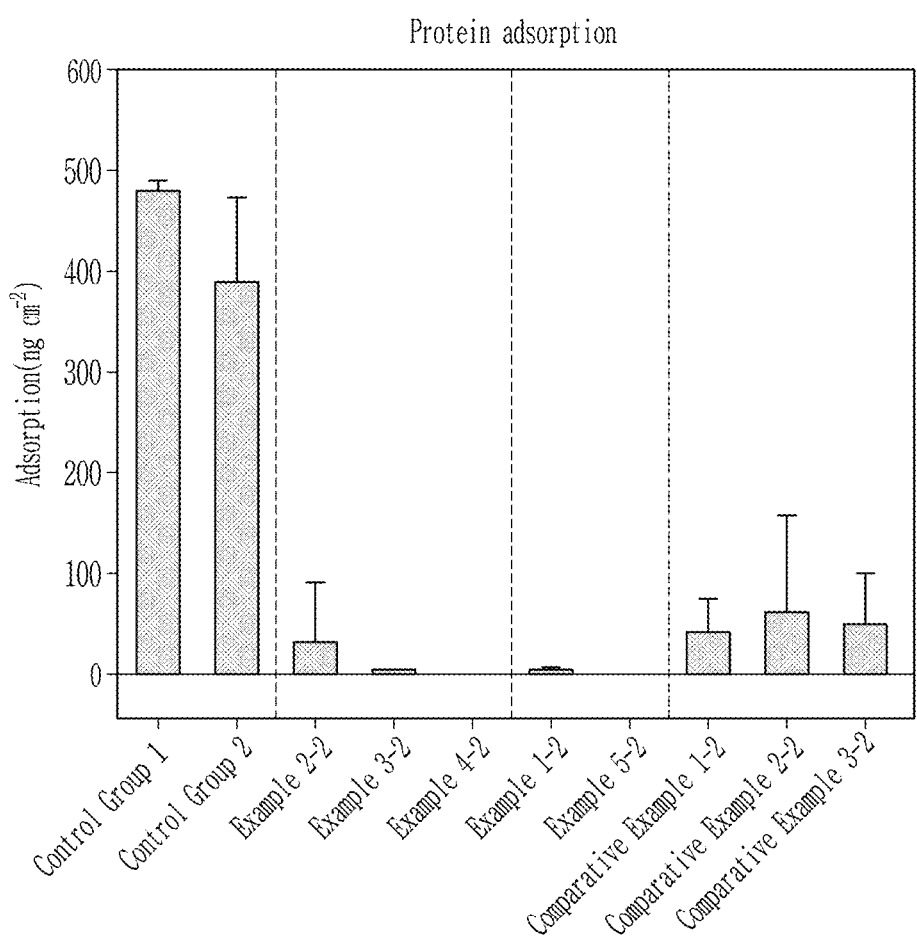
FIG. 6B is a graph showing protein adsorption on the solid surface coated with antifouling coating compositions according to Examples 1-2 to 5-2 and Comparative Examples 1-2 to 3-2.

Then it is treated with bovine serum albumin (manufactured by Sigma, lyophilized powder, >96%) having a concentration of 1.0 mg/mL for 30 minutes and washed again with water for 30 minutes, and protein adsorption is measured and is shown in FIG. 6B.

Control Group 1 is not treated with an antifouling coating composition, and Control Group 2 is a composition in which polyethylene glycol having a weight average molecular weight of 10,000 g/ml is dissolved in water at a concentration of 1.0 g/ml is used instead of the antifouling coating compositions according to Examples 1-2 to 5-2 and Comparative Examples 1-2 to 3-2.

Referring to FIGS. 6A and 6B, it is confirmed that a polymer is hardly absorbed on the surface in Control Group 2, so bovine serum albumin (i.e., a protein) is adsorbed on the sensor surface, which is not appropriate to be used as an antifouling coating composition.

On the other hand, referring to FIG. 6A, the solid surfaces coated with the antifouling coating compositions according to Examples 1-2 to 5-2 have copolymer adsorption of about 300 to 1400 ng/cm$^2$, so it is confirmed that the ABA-type Triblock Copolymers 1 to 5 have excellent adhesion properties to the solid surface.

Furthermore, referring to FIG. 6B, it is confirmed that the solid surfaces coated with the antifouling coating compositions according to Examples 1-2 to 5-2 have protein adsorption of about 0 to 29 ng/cm$^2$ when treating the same with a bovine serum albumin (protein); on the other hand, the solid surfaces coated with the antifouling coating compositions of Comparative Examples 1-2 to 3-2 have protein adsorption of 36 to 59 ng/cm$^2$, and the solid surfaces coated with the compositions according to Control Groups 1 and 2 have protein adsorption of 480 ng/cm$^2$ and 387 ng/cm$^2$, respectively.

In other words, the solid surfaces coated with the antifouling coating composition according to Examples 1-2 to 5-2 have low protein adsorption, compared with the antifouling coating compositions according to Comparative Examples 1-2 to 3-2, and Control Groups 1 and 2, so it is confirmed that it has excellent antifouling properties.

Summarizing, compared with the antifouling coating compositions including polyethylene glycol including no Moiety A, the AB-type diblock copolymer, or the ABA-type triblock copolymer having less than 4 of Moiety A, the antifouling coating composition according to an embodiment may have excellent storage stability and excellent adhesion properties to the solid surface, so that it may be uniformly coated on a variety of types of substrates, and the solid surface coated by using the antifouling coating composition according to an embodiment has very excellent antifouling properties.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

100: substrate
200: biological polluting materials
300: brush-shaped polymer
400: loop-shaped polymer according to the present embodiment

What is claimed is:

1. An antifouling coating composition, comprising:
a copolymer including two or more moieties represented by Chemical Formula 1, and a linking group between the two or more moieties:

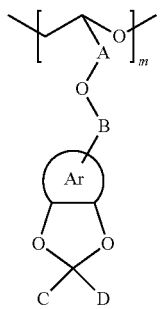

[Chemical Formula 1]

wherein, in Chemical Formula 1,
Ar is a substituted or unsubstituted C6 to C16 aromatic hydrocarbon ring,
A and B are independently a single bond, a substituted or unsubstituted C1 to C3 aliphatic hydrocarbon group, a substituted or unsubstituted C3 to C16 alicyclic hydrocarbon group, a substituted or unsubstituted C6 to C20 aromatic hydrocarbon group, a substituted or unsubstituted C1 to C20 heteroalicyclic hydrocarbon group, —S—, —$SO_2$—, —($CR^aR^b$)($NR^cR^d$), or a combination thereof,
wherein $R^a$ to $R^d$ are independently hydrogen, a substituted or unsubstituted C1 to C20 aliphatic hydrocarbon group, a substituted or unsubstituted C1 to C20 heteroaliphatic hydrocarbon group, a substituted or unsubstituted C3 to C20 alicyclic hydrocarbon group, a substituted or unsubstituted C1 to C20 heteroalicyclic hydrocarbon group, a substituted or unsubstituted C6 to C30 aromatic hydrocarbon group, a substituted or unsubstituted C2 to C30 heteroaromatic hydrocarbon group, or a combination thereof,
C and D are independently hydrogen, a hydroxy group, a substituted or unsubstituted C1 to C20 aliphatic hydrocarbon group, a substituted or unsubstituted C1 to C20 heteroaliphatic hydrocarbon group, a substituted or unsubstituted C3 to C20 alicyclic hydrocarbon group, a substituted or unsubstituted C1 to C20 heteroalicyclic hydrocarbon group, a substituted or unsubstituted C6 to C20 aromatic hydrocarbon group, a substituted or unsubstituted C2 to C20 heteroaromatic hydrocarbon group, or a combination thereof, and
m is an integer of 4 or more.

2. The antifouling coating composition of claim 1, wherein the linking group comprises a structural unit represented by Chemical Formula 2:

*—[($C_nH_{2n}$)—O—]—*     [Chemical Formula 2]

wherein, in Chemical Formula 2,
n is an integer of 2 to 4, and
* is a linking point.

3. The antifouling coating composition of claim 1, wherein a weight average molecular weight of the linking group is about 500 g/mol to about 50,000 g/mol.

4. The antifouling coating composition of claim 1, wherein Ar of Chemical Formula 1 is a substituted or unsubstituted benzene, a substituted or unsubstituted naphthalene, a substituted or unsubstituted anthracene, a substituted or unsubstituted phenanthrene, a substituted or unsubstituted pyrene, or a combination thereof.

5. The antifouling coating composition of claim 1, wherein A and B of Chemical Formula 1 are independently a substituted or unsubstituted C1 to C3 alkylene group, a substituted or unsubstituted C2 or C3 alkenylene group, or a combination thereof.

6. The antifouling coating composition of claim 1, wherein A and B of Chemical Formula 1 are independently a substituted or unsubstituted methylene group, a substituted or unsubstituted ethylene group, a substituted or unsubstituted propylene group, or a combination thereof.

7. The antifouling coating composition of claim 1, wherein C and D of Chemical Formula 1 are independently a substituted or unsubstituted methyl group, a substituted or unsubstituted ethyl group, a substituted or unsubstituted propyl group, a substituted or unsubstituted butyl group, a substituted or unsubstituted pentyl group, a substituted or unsubstituted hexyl group, or a combination thereof.

8. The antifouling coating composition of claim 1, wherein m of Chemical Formula 1 is an integer of 4 to 100.

9. The antifouling coating composition of claim 1, wherein a number average molecular weight of the copolymer is about 1000 g/mol to about 70,000 g/mol.

10. The antifouling coating composition of claim 1, wherein the copolymer has polydispersity of about 1 to about 2.

11. A method of preparing a copolymer, comprising reacting a substituted or unsubstituted polyalkylene glycol, an organic base catalyst including a substituted or unsubstituted C3 to C20 branched alkyl group, and a compound represented by Chemical Formula 3:

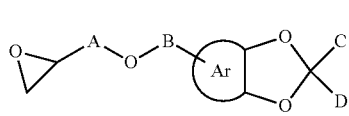

[Chemical Formula 3]

wherein, in Chemical Formula 3,

Ar is a substituted or unsubstituted C6 to C16 aromatic hydrocarbon ring,

A and B are independently a single bond, a substituted or unsubstituted C1 to C3 aliphatic hydrocarbon group, a substituted or unsubstituted C3 to C16 alicyclic hydrocarbon group, a substituted or unsubstituted C6 to C20 aromatic hydrocarbon group, a substituted or unsubstituted C1 to C20 heteroalicyclic hydrocarbon group, —S—, —SO$_2$—, —(CR$^a$R$^b$)(NR$^c$R$^d$), or a combination thereof, wherein R$^a$ to R$^d$ are independently hydrogen, a substituted or unsubstituted C1 to C20 aliphatic hydrocarbon group, a substituted or unsubstituted C1 to C20 heteroaliphatic hydrocarbon group, a substituted or unsubstituted C3 to C20 alicyclic hydrocarbon group, a substituted or unsubstituted C1 to C20 heteroalicyclic hydrocarbon group, a substituted or unsubstituted C6 to C30 aromatic hydrocarbon group, a substituted or unsubstituted C2 to C30 heteroaromatic hydrocarbon group, or a combination thereof, and C and D are independently hydrogen, a hydroxy group, a substituted or unsubstituted C1 to C20 aliphatic hydrocarbon group, a substituted or unsubstituted C1 to C20 heteroaliphatic hydrocarbon group, a substituted or unsubstituted C3 to C20 alicyclic hydrocarbon group, a substituted or unsubstituted C1 to C20 heteroalicyclic hydrocarbon group, a substituted or unsubstituted C6 to C20 aromatic hydrocarbon group, a substituted or unsubstituted C2 to C30 heteroaromatic hydrocarbon group, or a combination thereof.

12. The method of claim 11, wherein the substituted or unsubstituted polyalkylene glycol is polyethylene glycol, polypropylene glycol, methoxypolyethylene glycol, ethoxypolyethylene glycol, propoxy polyethylene glycol, methoxy polypropylene glycol, ethoxy polypropylene glycol, propoxy polypropylene glycol, or a combination thereof.

13. The method of claim 11, wherein the organic base catalyst including the substituted or unsubstituted C3 to C20 branched alkyl group is represented by Chemical Formula 4:

[Chemical Formula 4]

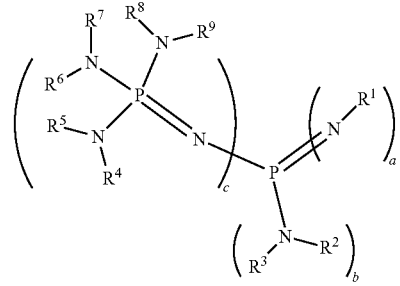

wherein, in Chemical Formula 4,

R$^1$ to R$^9$ are independently a substituted or unsubstituted C1 to C20 alkyl group, a substituted or unsubstituted C3 to C30 cycloalkyl group, or a combination thereof, or at least two adjacent groups of R$^1$ to R$^9$ are linked to each other to form a ring, at least one of R$^1$ to R$^9$ is a substituted or unsubstituted C3 to C20 branched alkyl group, and a to c are independently an integer of 0 to 5, provided that the sum of 2a, b, and c is 5.

14. The method of claim 13, wherein R$^1$ of Chemical Formula 4 is a substituted or unsubstituted C3 to C20 branched alkyl group.

15. The method of claim 13, wherein the substituted or unsubstituted C3 to C20 branched alkyl group of Chemical Formula 4 is a tert-butyl group.

16. The method of claim 11, wherein the reaction is performed at about 20° C. to about 65° C.

17. An antifouling film produced from the antifouling coating composition of claim 1.

18. The antifouling film of claim 17, which is produced by coating the antifouling coating composition on a surface requiring antifouling coating.

19. The antifouling film of claim 17, wherein the antifouling coating composition is treated with a catalyst for detaching an acetonide group of the copolymer in the composition before the coating.

20. The antifouling film of claim 18, wherein the catalyst comprises hydrochloric acid (HCl in H$_2$O), zirconium tetrachloride (ZrCl$_4$), aqueous tert-butyl hydroperoxide, indium trichloride, trifluoroacetic acid (CF$_3$CO$_2$H), perchloric acid (HClO$_4$), para-toluene sulfonic acid (p-TsOH), or combinations thereof.

* * * * *